United States Patent [19]

Umehara et al.

[11] Patent Number: 5,446,605
[45] Date of Patent: Aug. 29, 1995

[54] METHOD AND APPARATUS FOR MOVING HEAD FROM ONE TAPE TRACK TO ANOTHER AGAINST THE RISK OF DAMAGING THE TAPE

[75] Inventors: Shinji Umehara, Kodaira; Mitsuru Hasegawa, Komae; Kohji Nagai, Musashino; Yoshinobu Yanagibashi, Tokyo, all of Japan

[73] Assignee: TEAC Corporation, Tokyo, Japan

[21] Appl. No.: 170,518

[22] Filed: Dec. 20, 1993

[30] Foreign Application Priority Data

Dec. 24, 1992 [JP] Japan .................................. 4-359085

[51] Int. Cl.⁶ .............................................. G11B 15/08
[52] U.S. Cl. .................................. 360/74.6; 360/72.3; 360/78.02; 360/73.06
[58] Field of Search ................ 360/78.02, 78.01, 77.12, 360/74.5, 74.6, 72.1, 72.3, 75, 71, 74.1, 73.05, 73.06, 73.07, 73.08

[56] References Cited

U.S. PATENT DOCUMENTS 3,692,255  9/1972  Von Behren ........................ 242/192
4,414,593  11/1983  Miller et al. ................. 360/78.02 X
5,353,177  10/1994  Yanagibashi ................ 360/73.06 X Primary Examiner—Aristotelis M. Psitos
Assistant Examiner—Jim Habermehl
Attorney, Agent, or Firm—Woodcock Washburn Kurtz Mackiewicz & Norris

[57] ABSTRACT

A bidirectional, multitrack magnetic tape subsystem is disclosed which is for use with a two-reel, belt-driven tape cartridge in which the tape tension increases linearly with tape travel in either direction. Upon completion of writing or reading data along one track, the tape is stopped at one extremity thereof and then reversed toward the other extremity, with the head unit held on said one track. Only after the tape has been reversed a predetermined short distance is the head unit shifted from said one to another track, preferably with the tape held at a standstill during such shifting. Thus the head unit travels between the bidirectional tracks on the tape when the tape tension is substantially at a minimum, thereby avoiding possible damage to the tape.

6 Claims, 4 Drawing Sheets

METHOD AND APPARATUS FOR MOVING HEAD FROM ONE TAPE TRACK TO ANOTHER AGAINST THE RISK OF DAMAGING THE TAPE

BACKGROUND OF THE INVENTION

This invention relates generally to magnetic tape apparatus, particularly to tape transports for use as peripheral devices or subsystems of computer systems, and more particularly to those for use with two-reel, belt-driven, bidirectional multitrack tape cartridges of the type disclosed in U.S. Pat. No. 3,692,255 filed by Von Behren and assigned to Minnesota Mining and Manufacturing Company, of Minnesota, the United States, although it is not desired that the invention be limited to this particular type of tape assembly. Still more particularly, the invention pertains to a method of, and apparatus for, moving the magnetic transducer or head of such tape transport from a forward track to a reverse track, or vice versa, across the tape of such tape assembly against the risk of damaging the tape in so doing.

The two-reel tape cartridge according to Von Behren employs a flexible belt for bidirectionally driving the tape between a pair of reel hubs. The driving belt extends along a belt guide path around guide rollers adjacent the reel hubs and a belt driving roller therebetween and contacts the tape on the reel hubs. The rotation of the belt driving roller causes the belt to frictionally drive the tape reels to tension the tape and to move the tape between the reels. This cartridge construction offers the advantages of low power bidirectional drive and rapid acceleration and deceleration of the tape by a single reversible drive motor.

There has been a problem, however, that has been left unsolved with the belt-driven bidirectional tape cartridge discussed above. The problem arises from the fact that the tape tension of the cartridge progressively increases with tape travel from one tape extremity to the other in either direction, as has been confirmed by the applicant. Although the reason for this is not necessarily clear, the most reasonable explanation seems to be the change in tape diameters on both reels.

Conventionally, for shifting the magnetic transducer from one forward tack to a reverse one, or vice versa, the tape has been stopped when the transducer has read or write data to the end of a forward or reverse track, and then the transducer has been shifted to a reverse or forward track for reading or writing data thereon. Since the tape tension increases as aforesaid with tape travel from one extremity to the other, the conventional practice has been to shift the transducer across the tape when its tension is the highest. The transducer is customarily configured for smooth travel in the longitudinal, but not transverse, direction of the tape. This transducer configuration has so far been damaging to the tape because the transverse travel of the transducer has taken place when the tape tension is the highest, that is, when the transducer is most strongly pressed against the tape. Similar problems have been encountered with other bidirectional tape assemblies in which tape tension grows higher with tape travel from one extremity to the other.

SUMMARY OF THE INVENTION

The present invention seeks, in apparatus for use with bidirectional, multitrack tape assemblies of the kind defined, to move the transducer from a forward to a reverse track, or vice versa, against the danger of damaging the tape in so doing.

Briefly, the invention concerns a magnetic tape apparatus having a head unit for writing and/or reading data along at least two bidirectional data tracks on a length of magnetic recording tape of a tape assembly, wherein the tape travels with increasing tension in either direction between a pair of reels of the tape assembly. More specifically, the invention provides a method, in such tape apparatus, of moving the head unit across the tape from one track to another thereon. According to the broadest aspect of the method, the tape is run from a first toward a second extremity thereof and then stopped. Then, instead of shifting the head unit across the tape, the tape is run a predetermined minimal distance from the second back toward the first extremity thereof. Only then is the head unit shifted across the tape from one track to another, preferably with the tape held at a standstill.

In tape assemblies of the kind in question, the tape tension drops to the minimum when the tape is reversed. It will therefore be appreciated that according to the invention, the head unit is shifted between the bidirectional tracks on the tape when the tape tension is substantially at the minimum, instead of at the maximum as in the prior art. Possible damage to the tape is thus effectively avoided. Additionally, because of the reduction of the sliding resistance with which the head unit travels across the tape, the load on a stepper motor or other drive means for such transverse travel of the head unit is reduced correspondingly.

The above and other features and advantages of this invention and the manner of realizing them will become more apparent, and the invention itself will best be understood, from a study of the following description and appended claims, with reference had to the attached drawings showing the best mode of carrying out the invention.

DETAILED DESCRIPTION

Figure 1:
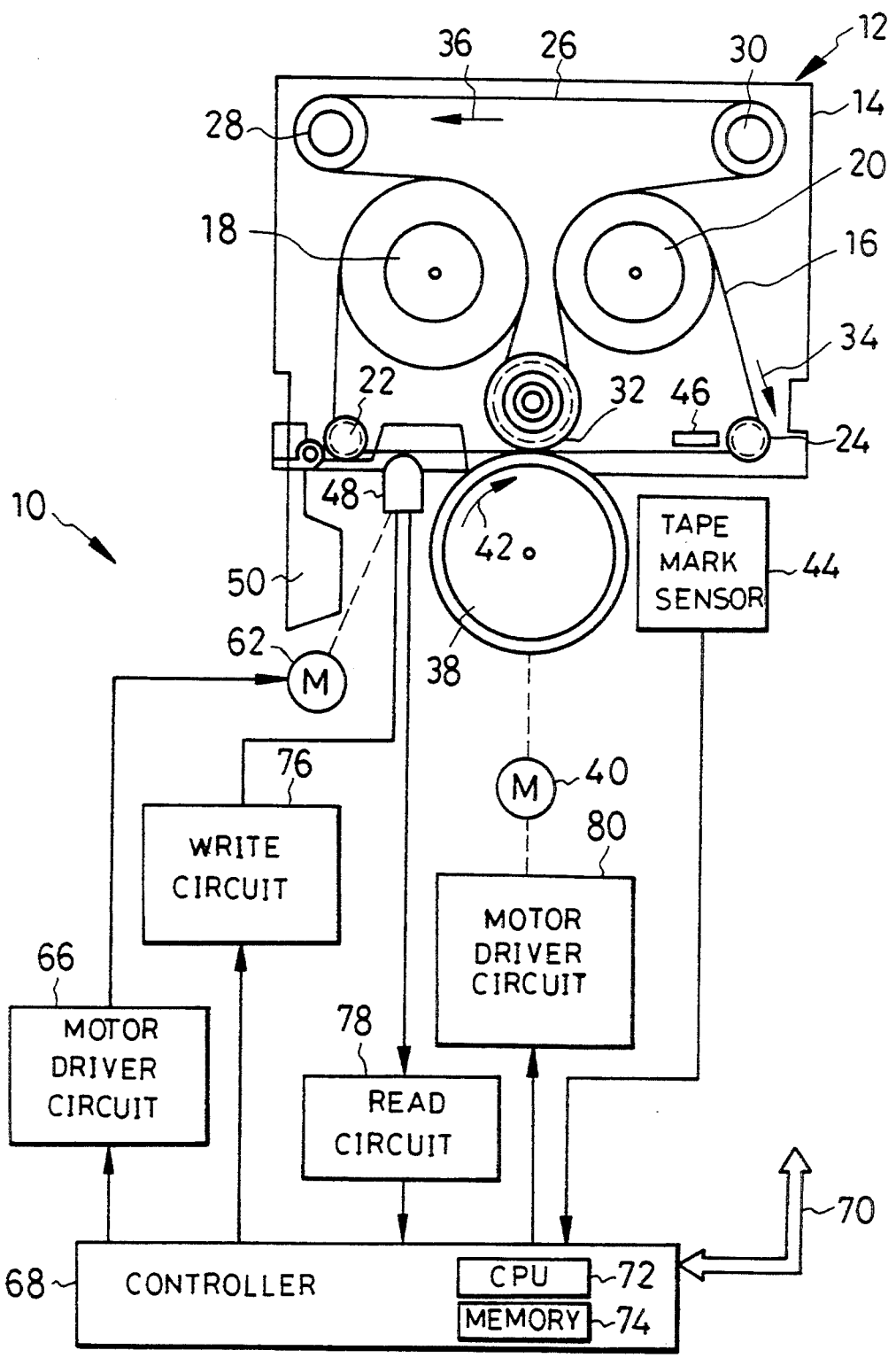
FIG. 1 is a combined block diagrammatic and pictorial illustration of a typical magnetic tape subsystem for use in the practice of this invention, the tape subsystem being shown together with a belt-driven, multitrack, bidirectional tape cartridge.

The invention will now be described in detail in terms of the magnetic tape subsystem of FIG. 1 which operates under the control of a host computer system. Generally designated 10, the tape subsystem is for use with a belt-driven tape cartridge 12 of the DC200 class introduced by 3M. The tape cartridge 12 has a housing 14 within which a length of magnetic tape 16 extends between a pair of reel hubs 18 and 20 along a tape guide path defined by two guide rolls 22 and 24. Customarily, both extremities of the tape 16 are not positively anchored to the reel hubs 18 and 20 but simply held against them.

Also enclosed in the cartridge housing 14 is a flexible, endless belt 26 for driving the tape 16 between the reel hubs 18 and 20. The belt 26 extends along a belt guide path around two guide rolls 28 and 30 adjacent the respective reel hubs 18 and 20 and a driving roll 32 therebetween and contacts the tape 16 on the reel hubs.

The rotation of the belt driving roll 32 causes the belt 26 to frictionally drive the reel hubs 18 and 20 to tension the tape 16 and to move the tape between the reels. Thus the tape 16 travels forwardly or in the direction of the arrow 34 with the travel of the drive belt 26 in the direction of the arrow 36, and reversely with the travel of the drive belt in the opposite direction.

The tape subsystem 10 for use with the belt-driven tape cartridge 12 includes a drive roll 38 which is coupled to a bidirectional, variable speed electric motor 40. When the tape cartridge 12 is loaded in position within the tape subsystem 10, the drive roll 38 makes driving engagement with the belt driving roll 32 of the tape cartridge, without contacting the tape 16, through an access opening, not shown, in one edgewall of the cartridge housing 14. Driven by the motor 40, the drive roll 38 rotates in the direction of the arrow 42 for forwardly driving the tape 16, and in the opposite direction for reversely driving the tape.

Figure 2:
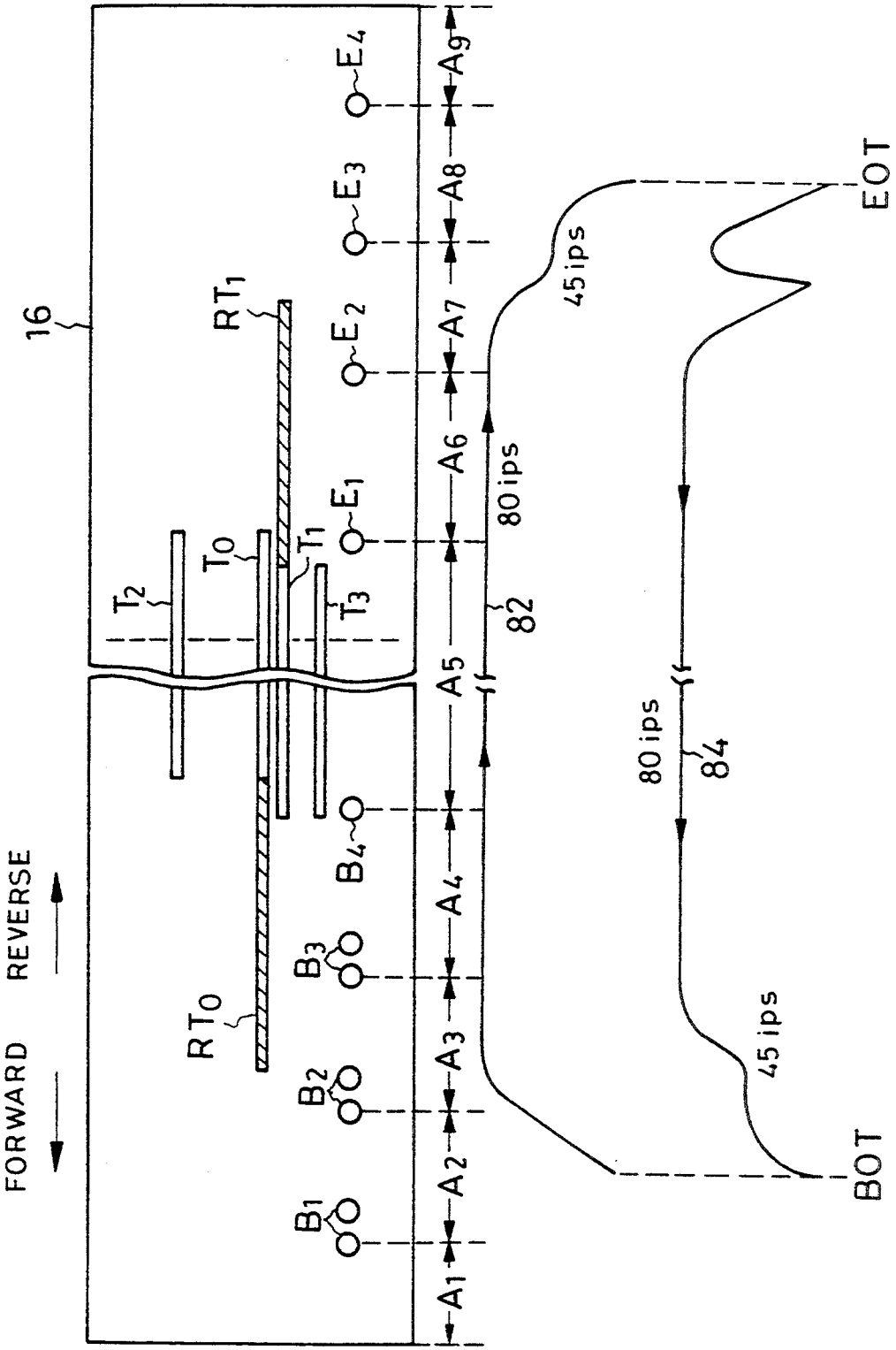
FIG. 2 is an enlarged, partly broken away, diagrammatic illustration of the tape of the belt-driven tape cartridge of FIG. 1, the tape being shown together with a graphic representation of its variable traveling speeds as the head unit of the tape subsystem scans a forward and a reverse track of the tape.

FIG. 2 is a greatly enlarged, fragmentary illustration of the tape 16 of the DC2000 cartridge 12. The tape 16 has conventionally formed therein three pairs of beginning-of-tape (BOT) holes $B_1$, $B_2$ and $B_3$, a track beginning hole $B_4$, a track end hole $e_1$, and three end-of-tape (EOT) holes $E_2$, $E_3$ and $E_4$. The three pairs of BOT holes $B_1$, $B_2$ and $B_3$ are all disposed adjacent the beginning, shown directed to the left in FIG. 2, of the tape 16 and arranged in that order from the beginning toward the end of the tape. The track beginning hole $B_4$ is disposed upstream, with respect to the predetermined forward traveling direction of the tape, of the BOT hole $B_3$. The track end hole $E_1$ and the three EOT holes $E_2$, $E_3$ and $E_4$ are all disposed adjacent the end of the tape 16 and arranged in that order from the beginning toward the end of the tape.

Not only the tape markers $B_1$, $B_2$ and $B_3$ and $E_2$, $E_3$ and $E_4$ but also the track markers $B_4$ and $E_1$ are utilized for controlling tape travel according to the invention. For simplicity, therefore, the three pairs of BOT holes $B_1$, $B_2$ and $B_3$ and track beginning hole $B_4$ will be hereinafter referred to as the BOT marks, and the track end hole $E_1$ and three EOT holes $E_2$, $E_3$ and $E_4$ as the EOT marks.

The tape 16 may be thought of as being divided into sections $A_1$ through $A_9$ by the four BOT marks $B_1$ through $B_4$ and the four EOT marks $E_1$ through $E_4$. In the DC2000 tape cartridge the tape sections $A_1$ is through $A_3$ and $A_7$ through $A_9$ are each 12 inches long, the tape sections $A_4$ and $A_6$ each 30 inches long, and the tape section $A_5$ 205 feet long. Data is written on the tape section $A_5$.

FIG. 2 shows only two forward data tracks, Track Zero $T_0$ and Track Two $T_2$, and two reverse data tracks, Track One $T_1$ and Track Three $T_3$, for simplicity. It is understood that the tape 16 has thirteen other similar forward data tracks and twelve other similar reverse data tracks, all laid parallel to each other. Data is to be written and read along the forward data tracks during forward tape travel, and along the reverse data tracks during reverse tape travel.

Also shown in FIG. 2 are a reference burst track $RT_0$ disposed immediately downstream, with respect to the forward traveling direction of the tape 16, of Track Zero $T_0$ and in alignment therewith, and another reference burst track $RT_1$ disposed immediately downstream, with respect to the reverse traveling direction of the tape, of Track One $T_1$ and in alignment therewith. These reference burst tracks are customarily used for gain control of a read amplifier included in the associated tape transport, as well as for positioning the head unit of the tape transport in centerline alignment with the reference burst tracks and, in consequence, with Tracks Zero and One.

With reference back to FIG. 1 the tape subsystem 10 has an optical tape mark sensor 44 which senses the BOT marks $B_1$ through $B_4$ and EOT marks $E_1$ through $E_4$ on the tape 16 as they travel past the sensor. A mirror 46 is mounted within the cartridge housing 14 to aid in the optical sensing of the tape marks. At 48 is shown a bidirectional, combined read/write head unit which is admitted into the cartridge housing 14 as its hinged door 50 is opened, for reading and writing data along the forward and reverse data tracks $T_0$, $T_1$, . . . as well as reference bursts along the tracks $RT_0$ and $RT_1$.

Figure 3:
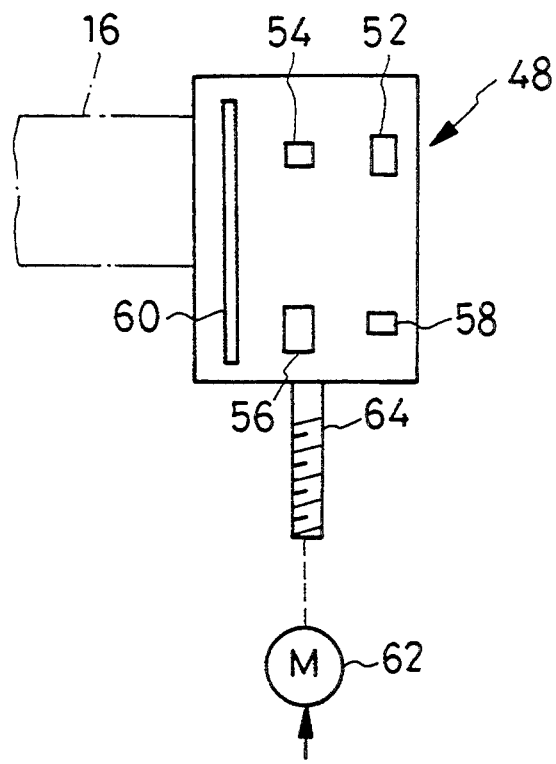
FIG. 3 is an enlarged plan view of the head unit of the FIG. 1 tape subsystem, shown together with means for shifting the head unit from track to track on the tape.

As illustrated on an enlarged scale in FIG. 3, the head unit 48 comprises a forward write head 52, a forward read head 54, a reverse write head 56, a reverse read head 58, and an erase head 60. The forward write head 52 and read head 54 are aligned longitudinally of the tape 16, and so are the reverse write head 56 and read head 58, with a spacing of approximately nine times the pitch of the data tracks between forward heads 52 and 54 and reverse heads 56 and 58 in the transverse direction of the tape.

The head unit 48 is movable transversely of the tape 16 by small increments or steps in order to be positioned in centerline alignment with the reference burst tracks $RT_0$ and $RT_1$, and for accessing the individual data tracks $T_0$, $T_1$, . . . thereon. Employed to this end is a bidirectional motor 62, shown in both FIGS. 1 and 3, of the known electrically stepping type which is coupled to the head unit 48 via a motion translating mechanism such as a lead screw 64. A driver circuit 66, FIG. 1, controllably energizes the stepper motor 62 under the direction of a tape transport controller 68 for causing the motor to incrementally drive the head unit 48 across the tape 16.

In practice the tape transport controller 68 may take the form of a programmable microprocessor which is interfaced with a host system, not shown, via a bus 70. Comprising a central processor unit (CPU) 72 and memories 74, the controller 68 performs various known control functions in addition to the control of tape travel in accordance with the invention.

The forward and reverse write heads 52 and 56 of the head unit 48 are connected to a write circuit 76, forward and reverse read heads 54 and 58 to a read circuit 78, and the erase head 60 to an erase circuit, not shown. Actually, a switch is provided for selectively connecting the write circuit 76 to the forward and reverse write heads, and another switch for selectively connecting the read circuit 78 to the forward and reverse read heads. Such switches are not shown because of their impertinence to the invention. Both write circuit 76 and read circuit 78 are connected to the controller 68.

The noted bidirectional, variable speed tape drive motor 40 is connected to a motor driver circuit 80 and thence to the controller 68. The driver circuit 80 controllably energizes the tape drive motor 40 for rotation at either of at least two different speeds of, say, 45 ips and 80 ips as specified by the controller 72.

Figure 4:
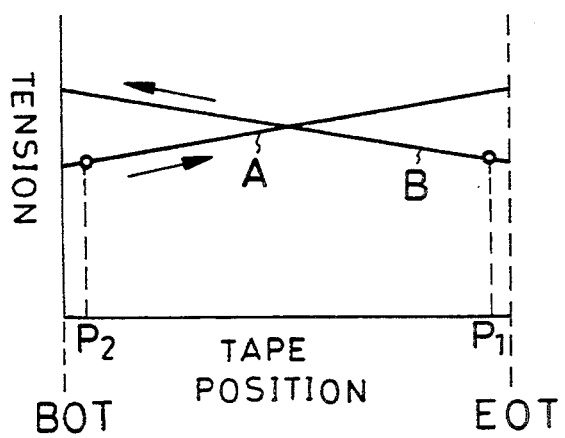
FIG. 4 is a graph explanatory of variations in tape tension as the FIG. 2 tape travels bidirectionally.

As graphically represented in FIG. 4, the tape tension of the cartridge 12 linearly increases with forward tape travel from the beginning to the end of the tape 16, as indicated by the curve A, and with reverse tape travel from the end to the beginning of the tape, as indicated by the curve B. The tape tension remains unchanged when the tape is stopped in any position intermediate its extremities.

Figure 5:
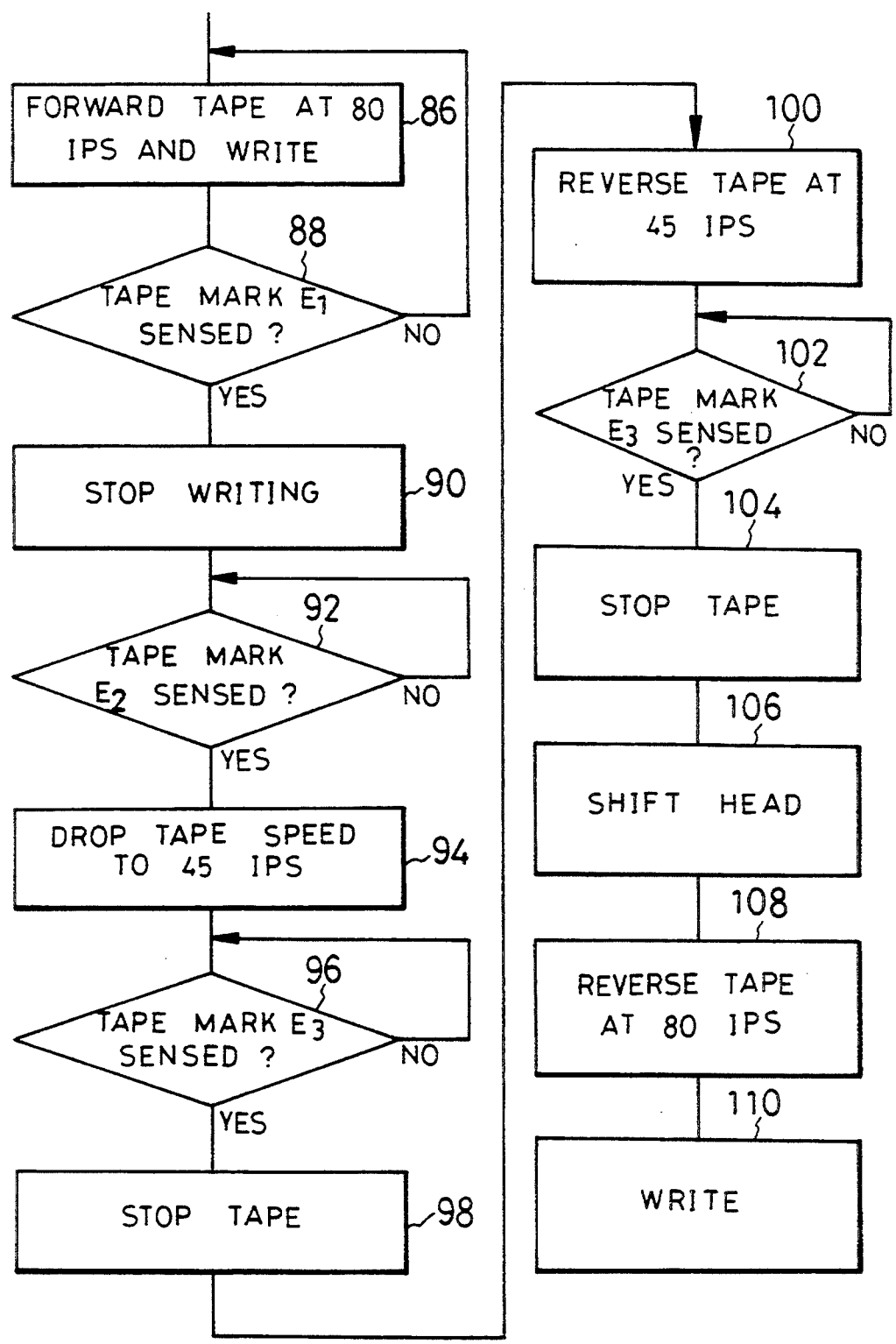
FIG. 5 is a flowchart showing a sequence of operations explanatory of how the head unit of the FIG. 1 tape subsystem is transferred from one track to another according to the invention.

FIG. 5 is a flowchart explanatory of part of a sequence of operations for writing data along alternating forward and reverse tracks on the tape 16 in accordance with the program introduced into the tape transport controller 68. The following discussion of the flowchart will be better understood by referring also to FIG. 2 in which the curve 82 plots the speed at which the tape 16 is run for writing data along each forward track, and the curve 84 the speed at which the tape is run for writing data along each reverse track.

Assume that data is to be first written on Track Zero $T_0$. Then the head unit 48, or its forward write head 52 to be more exact, may be positioned in centerline alignment with the forward reference burst track $RT_0$ and therefore with Track Zero by any known or suitable method. Also, the tape 16 may be conventionally rewound and so longitudinally positioned with respect to the head unit 48 that the latter may be situated in the second tape section $A_2$. Such conventional initialization routine is not shown in FIG. 5.

According to the first block 86 of the FIG. 5 flowchart, the tape 16 is started to run forwardly at a desired read or write speed of, typically, 80 ips. Then reference burst may be written when the BOT mark $B_2$ is sensed, and the writing of data along Track Zero $T_0$ may be started when the BOT mark $B_4$ is sensed.

A logical node 88 is then encountered which asks if the first EOT mark $E_1$ is sensed. The writing is discontinued according to the next block 90 when the first EOT mark $E_1$ is detected. Data has thus been written only on the tape section $A_5$.

The tape speed is maintained at 80 ips after the first EOT mark $E_1$ has been detected, but reduced to, say, 45 ips when the second EOT mark $E_2$ is sensed, according to node 92 and block 94. It is understood that a head shift command, dictating the shifting of the head unit 48 to reverse Track One $T_1$, is supplied from the unshown host system to the controller 68 by way of the bus 70 when the host system is informed of the detection of the EOT mark $E_2$.

As has been mentioned, in belt-driven tape cartridges under consideration, both extremities of the tape are not positively anchored to the reel hubs. Consequently, allowed to run to its extremities at 80 ips, the tape might come off the reels under some specific circumstances. The reduction of the tape speed to 45 ips at the block 94 is intended to preclude this danger and so is not an essential, though desirable, feature of this invention.

Then comes another logical node 96 which asks if the third EOT mark $E_3$ has been sensed. The tape is stopped according to the next block 98 when the third EOT mark $E_3$ is detected. The tape will come to a stop with the head unit 48 positioned on the tape section $A_5$, with practically no likelihood of the tape extremity coming off the payoff reel.

Heretofore, the head unit was moved to Track One $T_1$ after the tape had been stopped at the block 98 and so gave rise to the difficulties pointed out hereinabove. The head unit is not moved at this juncture according to the invention; instead, the tape is run reversely at 45 ips, as dictated by the block 100. Then, when the third EOT mark $E_3$ is sensed again at a logical node 102, the tape is stopped at the next block 104. The tape is run reversely a distance of not more than 54 inches.

Now, according to the next block 106, the reverse write head 56 of the head unit 48 is repositioned in centerline alignment with Track One $T_1$. The stepper motor 62 conventionally operates under the direction of the controller 68 for such repositioning of the head unit in response to the head shift command from the host system.

Next comes the block 108 which dictates to reverse the tape at 80 ips for writing reference burst along the reverse reference burst track $RT_1$ and then data along Track One $T_1$ according to the block 110. Such writing on Track One may be stopped when the first BOT mark $B_4$ is sensed. Then, according to an optional feature of the invention, the tape speed may be dropped from 80 ips to 45 ips when the second BOT mark $B_3$ is detected, and then stopped when the third BOT mark $B_2$ is detected, as will be understood from FIG. 2.

If then the head unit is to be repositioned on a forward track, such repositioning may be done in a manner essentially identical with the shifting of the head unit from a forward to a reverse track discussed above. Essentially the same procedure may also be followed for shifting the head unit from one forward track to another, from one reverse track to another, and for shifting the head unit from any track to any other track during reading.

As will be understood by referring to FIG. 4 again, the head unit is shifted from a forward to a reverse track in a tape position $P_1$, and from a reverse to a forward track in a tape position $P_2$. The tape tension is nearly the lowest in both tape positions $P_1$ and $P_2$, so that possible damage to the tape is also reduced nearly to a minimum.

The head shifting scheme according to the invention offers another advantage. The shifting of the head unit across the tape is known to cause some lateral displacement of the tape, and this lateral displacement persists until the tape subsequently runs a certain distance. The higher the tape tension, the greater is the lateral displacement of the tape as a result of the transverse travel of the head unit. It will therefore be appreciated that the invention practically minimizes such lateral tape displacement. As an additional advantage, the load on the stepper motor 62 is reduced because the head unit encounters less frictional resistance than heretofore as it travels across the tape when the tape tension is low.

Despite the foregoing detailed disclosure, it is not desired that the invention be limited by the exact showing of the drawings of the description thereof. The following, then, is a brief list of possible modifications, alterations and adaptations of this invention which are all believed to fall within the scope of the invention:

1. The head unit could be moved across the tape while the tape was running, instead of being at rest as in the foregoing example. The tape speed should be as low as practical in this case.

2. Various tape marks other than those shown in FIG. 2 might be employed.
3. A single head could be used for reading or writing along both forward and reverse tracks.
4. The invention could be applied to so-called digital cassettes and other tape assemblies where the same problem has been encountered as with belt-driven cartridges.

What is claimed is:

1. In a magnetic tape apparatus having a head unit for writing and/or reading data along at least two bidirectional data tracks on a length of magnetic recording tape of a tape assembly, wherein the tape travels with increasing tension in either direction between a pair of reels of the tape assembly, a method of moving the head unit across the tape from one track to another thereon, which comprises:
    (a) running the tape from a first toward a second extremity thereof;
    (b) stopping the tape;
    (c) running the tape a predetermined distance from the second toward the first extremity thereof;
    (d) stopping the tape after running the tape the predetermined distance from the second toward the first extremity thereof; and
    (e) moving the head unit across the tape from one track to another after the tape is stopped,
    (f) whereby the head unit is shifted between the bidirectional data tracks on the tape when the tape tension is substantially at a minimum.

2. The method of claim 1 wherein the predetermined distance is not more than 54 inches.

3. The method of claim 2 wherein the predetermined distance is from 1 inch to 54 inches.

4. In a magnetic tape apparatus having a head unit for writing and/or reading data along at least two bidirectional data tracks on a length of magnetic recording tape which extends between a pair of reels of a tape assembly without having its opposite extremities anchored thereto, wherein the tape travels with increasing tension in either direction between the reels, the tape having a first, a second, a third and a fourth tape mark arranged in that order from a first toward a second extremity of the tape at predetermined spacings in the longitudinal direction of the tape and all disposed adjacent the second extremity of the tape, a method of moving the head unit across the tape from one track to another thereon, which comprises:
    (a) running the tape from the first toward the second extremity thereof at a first predetermined speed for writing or reading data along one track on the tape by the head unit;
    (b) terminating the writing or reading upon detection of the first tape mark;
    (c) changing the tape speed from the first to a second predetermined speed, lower than the first predetermined speed, upon detection of the second tape mark;
    (d) stopping the tape upon detection of the third tape mark;
    (e) running the tape at the second predetermined speed from the second toward the first extremity thereof;
    (f) stopping the tape upon detection of the third tape mark while running the tape from the second toward the first extremity thereof; and
    (g) moving the head unit across the tape from said one track to another after the tape is stopped,
    (h) whereby the head unit is shifted between the bidirectional data tracks on the tape when the tape tension is substantially at a minimum.

5. The method of claim 4 wherein the first predetermined speed is about 80 inches per second, and the second predetermined speed about 45 inches per second.

6. In a magnetic tape apparatus having a head unit for writing and/or reading data on a length of bidirectional, multitrack magnetic recording tape which extends between a pair of reels of a tape assembly without having its opposite extremities anchored thereto, wherein the tape travels with increasing tension in either direction between the reels, the tape having a first, a second, a third and a fourth tape mark arranged in that order from a first toward a second extremity of the tape at predetermined spacings in the longitudinal direction of the tape and all disposed adjacent the second extremity of the tape, and a fifth, a sixth, a seventh and an eighth tape mark arranged in that order from the second toward the first extremity thereof in the longitudinal direction of the tape and all disposed adjacent the first extremity of the tape, a method of moving the head unit across the tape from one track to another thereon, which comprises:
    (a) running the tape at a first predetermined speed from the first toward the second extremity thereof for writing or reading data thereon by the head unit along any of a first group of parallel data tracks, and from the second toward the first extremity of the tape for writing or reading data thereon by the head unit along any of a second group of parallel data tracks;
    (b) terminating the writing or reading of data along any of the first group of data tracks upon detection of the first tape mark, and the writing or reading of data along any of the second group of data tracks upon detection of fifth tape mark;
    (c) changing the tape speed from the first to a second predetermined speed, lower than the first predetermined speed, upon detection of the second tape mark during tape travel from the first toward the second extremity thereof, and upon detection of the sixth tape mark during tape travel from the second toward the first extremity thereof;
    (d) ending the tape travel from the first toward the second extremity of the tape upon detection of the third tape mark, and the tape travel from the second toward the first extremity thereof upon detection of the seventh tape mark;
    (e) running the tape at the second predetermined speed from the second toward the first extremity thereof, and from the first toward the second extremity thereof
    (f) stopping the tape upon detection of the third tape mark while running the tape from the second toward the first extremity thereof, and upon detection of the seventh tape mark while running the tape from the second toward the first extremity thereof; and
    (g) moving the head unit across the tape from one of the first group of data tracks to one of the second group of data tracks after the tape is stopped upon detection of the third tape mark during the tape travel from the second toward the first extremity thereof, and from one of the second group of data tracks to one of the first group of data tracks after the tape is stopped upon detection of the seventh tape mark during the tape travel from the first toward the second extremity thereof,
    (h) whereby the head unit is shifted between any two of the first and second groups of data tracks on the tape when the tape tension is substantially at a minimum.

* * * * *